United States Patent [19]
Priest

[11] 3,821,550
[45] June 28, 1974

[54] PLANT THINNER HAVING RADIANT ENERGY PLANT DETECTING MEANS

[75] Inventor: Melvin E. Priest, Caldwell, Idaho

[73] Assignee: Deere & Company, Moline, Ill.

[22] Filed: Sept. 22, 1972

[21] Appl. No.: 291,419

Related U.S. Application Data

[63] Continuation of Ser. No. 843,122, July 18, 1969, abandoned.

[52] U.S. Cl............ 250/226, 209/111.6, 209/111.7, 250/339
[51] Int. Cl. ............................................. G01j 3/34
[58] Field of Search ........ 250/226, 222, 83.3 H, 86; 209/111.5, 111.6, 111.7; 172/5, 6; 356/178, 176, 177

[56] References Cited
UNITED STATES PATENTS

| | | |
|---|---|---|
| 2,502,468 | 4/1950 | Marihart............................ 250/226 |
| 2,514,405 | 7/1950 | Marihart............................ 250/226 |
| 2,690,043 | 9/1954 | Marihart............................ 250/226 |
| 3,064,136 | 11/1962 | Mann.................................. 250/226 |
| 3,206,022 | 9/1965 | Roberts.............................. 356/178 |
| 3,376,426 | 4/1968 | Frommer........................... 250/226 |
| 3,590,925 | 7/1971 | Troutner.......................... 209/111.7 |
| 3,675,769 | 7/1972 | Story................................ 209/111.5 |

*Primary Examiner*—James W. Lawrence
*Assistant Examiner*—D. C. Nelms

[57] ABSTRACT

A plant sensing device for operating a mechanical hoe and including apparatus such as a light source for detecting plants through energy reflected from the plants. The energy is separated into two components and the two components are compared. When a plant is adjacent the detector, the two components will have relatively large difference and when a plant is not present the components will be substantially the same. When the former occurs it creates a signal which operates the mechanical hoe.

6 Claims, 7 Drawing Figures

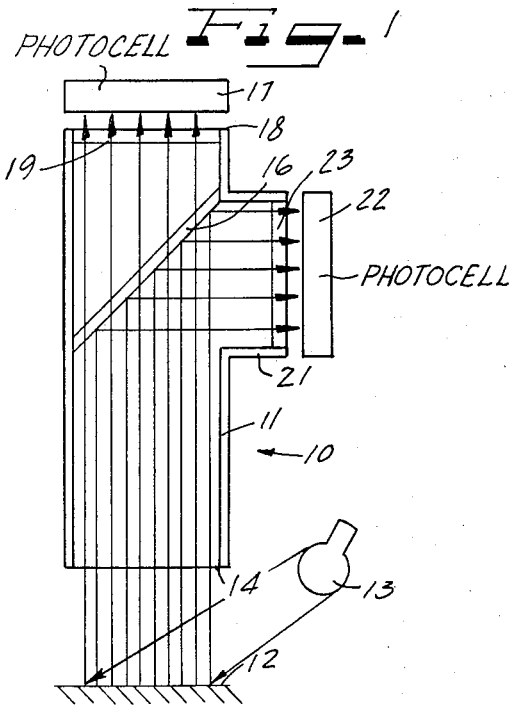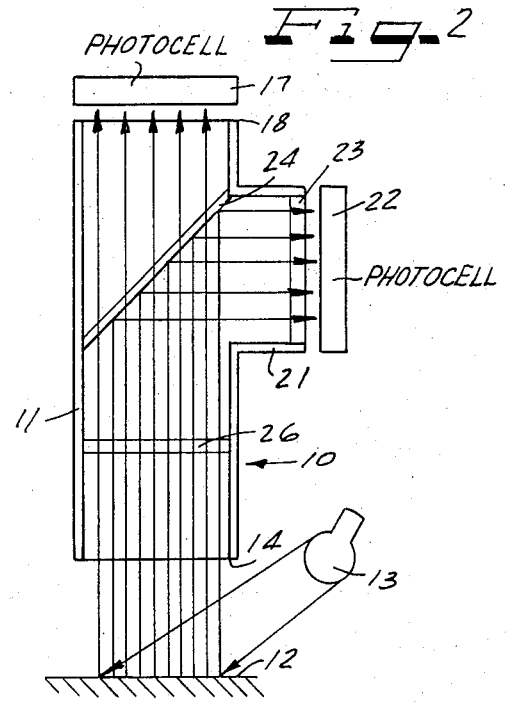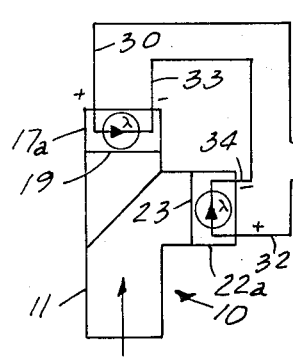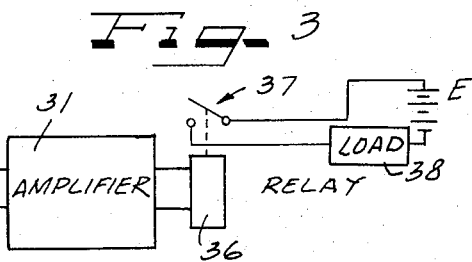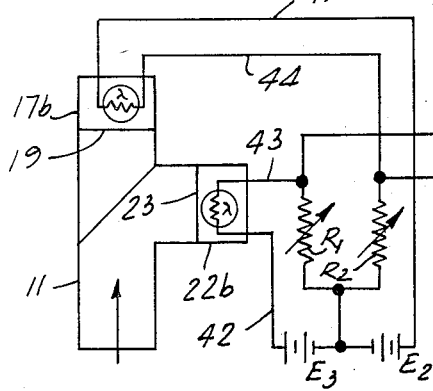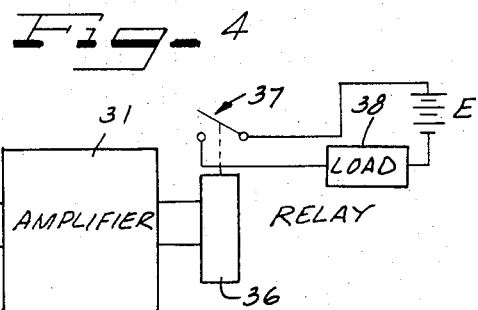
INVENTOR.
MELVIN E. PRIEST

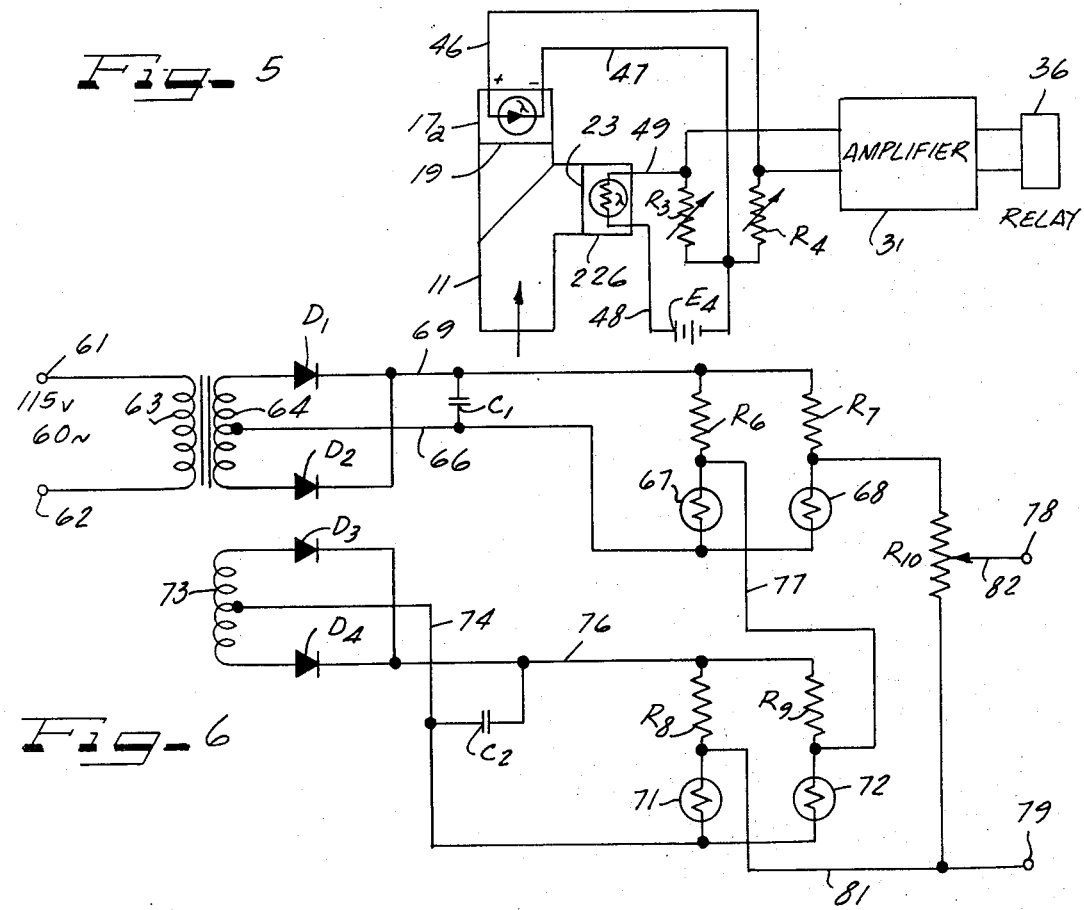
Fig-5
Fig-6
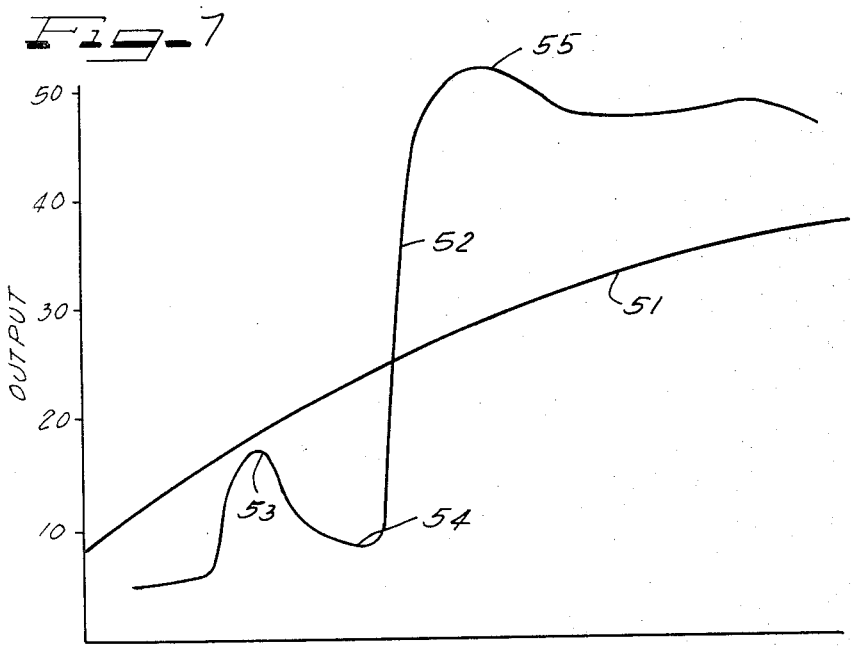
Fig-7
INVENTOR.
MELVIN E. PRIEST

PLANT THINNER HAVING RADIANT ENERGY PLANT DETECTING MEANS

BACKGROUND OF THE INVENTION

This application is a continuation of U.S. Pat. application Ser. No. 843,122, filed July 18, 1969, now abandoned.

FIELD OF THE INVENTION

The invention relates in general to energy detecting means and in particular to means for detecting objects such as plants.

DESCRIPTION OF THE PRIOR ART

Photoelectric devices have been utilized to detect energy reflected from plants; however, earth and other backgrounds have often provided a reflection which has been sensed as plants.

SUMMARY OF THE INVENTION

The present invention provides a radiant energy detector which (1) separates received energy into two components which differ from each other in wave length, and (2) energizes a pair of photoelectric cells or photosensitive resistant cells. The outputs of the photo detective devices are substantially equal when earth or other background material is reflecting energy. However, when a plant of particular type reflects energy into the detector, the output of the two photo devices will be substantially different, and this difference in output indicates the presence of such a plant.

The system compensates for shadows and variations in soil color since both cells are subjected to the same background variations at all times and both vary in applied intensity so that there is not unbalance unless the particular plant being detected is adjacent the energy receiving apparatus.

In certain embodiments a two-way mirror is utilized to separate the energy components and in other embodiments a filter is utilized to separate the energy components.

Other objects, features and advantages of the present invention will be readily apparent from the following detailed description of certain preferred embodiments thereof taken in conjunction with the accompanying drawings.

BRIEF DESCRIPTION OF THE DRAWINGS

FIG. 1 is a sectional view of the energy detector of this invention utilizing a two-way mirror to separate the received energy into two components;

FIG. 2 is a sectional view of the detector of this invention wherein a filter is utilized as the energy separating means;

FIG. 3 is an electrical schematic view illustrating the detector utilizing photo self-generating cells;

FIG. 4 is an electrical schematic of a detector utilizing photosensitive resistant cells;

FIG. 5 is an electrical schematic illustrating the use of one photo self-generating cell and one photosensitive resistant cell;

FIG. 6 illustrates a pair of detectors according to this invention connected in electrical schematic; and FIG. 7 illustrates the reflectivity characteristic of beet leaves and the reflectivity characteristic of soil.

DESCRIPTION OF THE PREFERRED EMBODIMENTS

This invention may be used in a crop thinner machine to selectively remove certain plants with a mechanical hoe. I have discovered that certain plant leaves have a non-linear reflectance characteristic as a function of wave length whereas soils of all types have a substantially smooth reflectance characteristic as a function of wave length.

Weeds and certain plants also have a smooth reflectance characteristic, but plants such as broccoli, lettuce, sugar beet, cotton, cabbage and onions have a non-linear response characteristic as a function of wave length. The detector of this invention detects plants such as broccoli, lettuce, sugar bett, cotton, cabbage and onions by receiving energy reflected from such plants and separates it into two components of differing wave lengths. The particular components are chosen so that the non-linearity of the reflectance characteristic of the particular plant will produce different amounts of energy in the two components. This difference in energy can be detected and used to actuate a load device such as a mechanical hoe.

A filter or half-silvered mirror may be used to separate the reflected energy into two components. Other filters may be used to obtain energy with the desired wave lengths so that energy which corresponds to the desired wave lengths may be obtained. Filters may be selected to take advantage of the non-linear reflectance characteristic of the particular plants to be detected.

FIG. 1 illustrates the detector of this invention, designated generally as 10, which is mounted on a tractor-towed machine (not shown) but having cutting mechanism for selectively removing plants. The detector comprises a light-gathering tube 11 formed with its open end toward the ground 12. An artificial light source 13 is mounted adjacent the tube 10 so as to direct light generally downwardly against the ground 12 and the energy from the light upon reflection will be reflected up into the tube 11. A two-way mirror 16 is mounted at a generally 45° angle within the tube 11 and part of the energy passing up through the tube will pass directly through the mirror 16 and will impinge upon a photocell 17 mounted adjacent the upper end 18 of the tube. A suitable filter 19 may be mounted across the end 18 of the tube, if desired. A second portion of the energy impinging on the mirror 16 will be reflected through a transverse portion 21 of tube 11 and will impinge on a second photocell 22. A filter 23 may be mounted across the end of the portion 21, if desired.

FIG. 2 illustrates a light-gathering tube 10 which has a suitable filter 24 mounted at an angle approximately 45° across it. The filter 24 will pass certain energy which impinges upon the photocell 17 and will reflect the second portion of the energy which will impinge upon the second photocell 22 in the transverse portion 21 of the tube. A filter 23 may be mounted in the tube portion 21, if desired.

A dust shield 26 of plain glass is mounted in the portion of the tube 11 between the lower edge 14 and the transverse portion 21.

The shield 26 remains fairly clean since, due to horizontal movement, a slight negative pressure exists in the tube 10 on the lower side of the shield. However, if dust collects on the shield it will be analogous to a shadow and will not interfere with the proper operation of the device.

FIG. 3 illustrates the detector of this invention in an electrical schematic wherein the photocells 17 and 22 are illustrated as photo self-generating cells of the solid state or tube type, for example, silicon cells or cadmium sulfide photocells. The positive terminal 30 of the cell 17a is connected to an amplifier 31 and the positive terminal 32 of the cell 22a is connected to the amplifier 31. The negative terminals 33 and 34 of the cells 17a and 22a, respectively, are connected together. As the detector scans the ground, light travels up the light-gathering tube 11 and splits due to the action of the filter or two-way mirror placed diagonally across the tube such that a portion of the energy hits the cell 17a and a second portion hits the cell 22a. If soils or other materials are below the light-gathering tube 11, as the amount of reflectance of the ground varies, the amount of light striking the photocells 17a and 22a will vary in the same fashion such that the cells produce equal voltages and the circuit stays balanced. When a selected plant passes under the tube, the nature of the incoming energy is altered and the filters 19 and 23 react differently to permit the cells to become unbalanced and a voltage will appear between the points 30 and 32 which is detected by the amplifier 31.

The amplifier 31 amplifies such signal and energizes a relay 36 which controls a switch 37 to actuate a load 38 which is energized by a battery E, for example.

FIG. 4 is a schematic view wherein the photocells 17 and 22 are photosensitive resistant types and are indicated as 17b and 22b, respectively. The resistance of cells 17b and 22b varies as a function of the amount of energy impinging upon them, and their resistance may be controlled by the impinging energy. One terminal of photosensitive resistance cell 17b is connected by lead 41 to the positive terminal of battery $E_2$ which has its negative terminal connected to the negative terminal of a battery $E_3$. The positive terminal of the battery $E_3$ is connected by a lead 42 to one terminal of the photosensitive resistance cell 22b. A pair of variable resistors $R_1$ and $R_2$ are connected together and have first ends connected to the junction point between the batteries $E_2$ and $E_3$. The second end of resistor $R_1$ is connected by lead 43 to the second terminal of the photosensitive resistance cell 22b and to the amplifier 31. The second end of the variable resistance $R_2$ is connected to the amplifier 31 and by lead 44 to the second terminal of the photosensitive resistance cell 17b. The batteries $E_2$ and $E_3$, the resistances $R_1$ and $R_2$ and the photosensitive resistance cells 17b and 22b comprise a bridge circuit which is balanced except when a plant passes under the light-gathering tube 11. At that time the circuit will become unbalanced and the amplifier 31 will energize relay 36 thus closing a switch 37 to energize the indicator 38.

FIG. 5 illustrates a modification of the invention wherein a photo self-generating cell 17a is utilized with a photosensitive resistance cell 22b. One output of the photo self-generating cell 17a is connected to the amplifier 31 by lead 46. The second lead 47 of cell 17a is connected to the negative terminal of a battery $E_4$. The positive terminal of battery $E_4$ is connected by lead 48 to one terminal of the photosensitive resistance cell 22b. The second terminal of the photosensitive resistance cell 22b is connected by lead 49 to the amplifier 31. A variable resistance $R_3$ is connected between lead 49 and the negative terminal of battery $E_4$. The variable resistance $R_4$ is connected between the negative terminal of battery $E_4$ and lead 46.

The battery $E_4$ provides power for the circuit in which cell 22b is mounted.

As the tube scans the ground, light will travel up the light-gathering tube and will impinge upon the cells 17a and 22b. The cells are matched so that the resistance cell allows a voltage from the battery $E_4$ equal to the voltage produced by the generating cell to be supplied to the amplifier 31. These voltages will cancel each other and the relay 36 will not be energized. The cells will remain balanced until a plant passes under the tube at which time the cells become unbalanced and a voltage appears at the amplifier and relay 36 is energized.

It should be realized, of course, that the cells 22b and 17a may be reversed in position and that the detector will operate equally well.

The sensing devices consist of a light-gathering means such as a tube in which is provided means for dividing the light into two channels by filters and/or mirrors. The two channels of energy then impinge upon two different light sensitive cells and by the proper selection of filters and cells, particular wave lengths can be partially blocked from one of the cells and not from the other. The cells will react differently to that color and it is this difference in reaction that produces a useful signal.

By the choice of proper filters, the detector will be sensitive to plants and can detect them. It has been discovered that background variation causes the light intensity reaching the light-gathering tube 11 to vary. For example, shadows, soil of different types, wet or dry soil do not unbalance the cells. However, when a plant has entered the light-gathering device, an instant change or unbalance occurs and a signal is detected.

The operation of the apparatus may be better understood by considering the graph illustrated in FIG. 7 which illustrates a first curve 51 showing the response of soil plotted with wave length versus energy received. Wave length is plotted in millimicrons or Angstroms divided by 10. A second curve 52 illustrates the reflectance of beet leaves as a function of wave length. It is to be noted that whereas the curve 51 is a generally smooth curve which increases gradually as the wave length becomes longer, that the reflective characteristic of beet leaves exhibits substantial variations as a function of wave length. Note, for example, there is a peak 53 at about 500 in the curve 52 and that then the response decreases to a point 54 at about 700 and that it rises very sharply to a peak in the vicinity of 800 which is indicated by numeral 55 in FIG. 7. Thus, if a first cell received energy primarily below 700 and a second cell received energy primarily above 800, very little difference in output would be observed when soil was passing under the detector in that the curve 51 is generally flat, but a substantial difference in output between the two cells would occur when a beet leaf passed under the detector.

In use, a detector cell, according to this invention, is generally about 1 inch in diameter and used to detect plants which might have a size of a nickel or quarter. The detector cell is mounted on a tractor and the operator must drive very straight over the small plants. By mounting a pair of detector cells side by side for spanning about 2 inches and connecting them properly, greater tolerance will be allowed to the tractor operator and either cell or both may detect the plants. FIG. 6 shows a pair of detector units that are mounted side by side. The units are energized by alternating current energy from a tractor source.

The primary 63 of a transformer is connected to terminals 61 and 62 which are connected to an output source of the tractor which might be 115 volt 60 cycle. A first secondary 64 of the transformer has its midpoint connected by lead 66 to first terminals of photoelectric cells 67 and 68. One end of the secondary 64 is connected to the diode rectifier $D_1$ and the other end of the secondary 64 is connected to a diode rectifier $D_2$ which has its other side connected to the second side of the diode $D_1$ and to a lead 69. The condenser $C_1$ is connected across leads 66 and 69. A resistor $R_6$ is connected from the second terminal of the photocell 67 to lead 69 and a resistor $R_7$ is connected from the second terminal of the cell 68 and the lead 69. A second secondary 73 is magnetically coupled to the primary 63 and has its midpoint connected by lead 74 to first input terminals of the second pair of photocells 71 and 72. The first end of the secondary 73 is connected to a diode rectifier $D_3$ and the other end is connected to a diode rectifier $D_4$. The other sides of the rectifiers $D_3$ and $D_4$ are connected together and to lead 76. A condenser $C_2$ is connected between leads 74 and 76. A resistor $R_8$ is connected from lead 76 to the second terminal of the cell 71 and a resistor $R_9$ is connected from the lead 76 to the second terminal of the cell 72. The lead 77 is connected between the second terminals of the cells 67 and 72. The pair of outlet terminals 78 and 79 may be connected to an amplifier such as the amplifier 31 illustrated in FIGS. 3, 4 and 5. Output terminal 79 is connected by lead 81 to the second terminal of the cell 71 and to one end of a resistor $R_{10}$ which has its opposite side connected to the second terminal of the cell 68. A wiper contact 82 engages resistor $R_{10}$ and is connected to terminal 78.

Although minor modifications might be suggested by those versed in the art, it should be understood that I wish to embody within the scope of the patent warranted hereon all such modifications as reasonably and properly come within the scope of my contribution to the art.

I claim:

1. For use in plant thinning apparatus adapted to be advanced along a row of spaced plants growing in soil of varying color and type and having tool means operable in response to a signal to remove selected plants from said row, means for detecting plants against the soil background and generating a signal to operate the tool means in response to the detection of a plant, said means comprising: a housing for receiving energy radiating from the plants and soil; means in the housing for separating the radiant energy into first and second components, said first component having a wave length range lying primarily below 700 millimicrons and said second component having a wave length range lying primarily above 700 millimicrons; first radiant energy detecting means in the housing for generating a first output corresponding to said first component; second radiant energy detecting means in the housing for generating a second output corresponding to said second component; and comparison means connected to receive said first and second outputs and operable to generate a signal to operate said tool means when the difference in magnitude of said output exceeds a selected value.

2. A plant sensing device for operating a mechanical hoe propelled by a tractor to move over a row of plants comprising: a light source supported to move with the tractor over the ground and directed at a row of plants so that it is directed intermittently at the ground and plants as the latter successively pass adjacent thereto; a filter device positioned to receive energy reflected from the plants and ground and for separating the energy received therefrom into two components; first radiant energy detecting means detecting one of said components and having an output corresponding to a selected range of wave lengths primarily below 700 millimicrons; second radiant energy detecting means detecting the other of said components and having an output corresponding to a range of wave lengths primarily above 800 millimicrons, the respective outputs having a larger differential when said light source is directed on a plant than when said light source is directed against the ground, a comparison means receiving said outputs of said first and second radiant energy detecting means for producing a signal in response to the larger differential only; and a connection between the mechanical hoe and said comparison means for operating the hoe in response to said signal.

3. An agricultural implement for thinning plants in a ground-borne row comprising: a vehicular unit adapted to move over the ground of said row; a hoe adapted to move with the unit for hoeing along the row; plant sensing means adapted to move with the unit including a light source directed at said row and a sensing apparatus that separates radiant energy received from the plants and the ground therebetween, respectively, into two components having wave lengths primarily within and below, respectively, the infrared range, detects the two components and generates outputs corresponding thereto, and compares said outputs and produces a signal when the light source reflects on a plant; and a connection between the sensing apparatus and the hoe for operating the latter in response to a signal being produced.

4. A method of detecting the presence of a ground-borne plant comprising:
 a. directing a light source toward the ground and in an area where a plant may exist;
 b. separating radiant energy reflected therefrom into two components of wave lengths, one of said components being primarily below and the other of said components being primarily within the infrared range;
 c. detecting the wave length composition of said two components so as to supply an output for each of said components corresponding to the ranges above and within, respectively, the infrared range; and
 d. comparing the outputs of the wave length compositions in said two components to respectively indicate the presence of ground or the presence of a plant.

5. Apparatus for thinning plants growing in a row in soil of varying color and type, said plants having an energy reflectance curve with an abrupt transition between energy wave lengths below 700 and above 800 millimicrons, and said soil, irrespective of its color or type, having a substantially smooth energy reflectance curve between energy wave lengths below 700 and above 800 millimicrons, said apparatus including tool means adapted to be advanced along the row and operable in response to a signal to remove selected plants from said row, and means for detecting plants against the soil background and generating a signal to operate the tool means in response to the detection of a plant, said detecting means comprising: a housing adapted to be advanced along the row with the tool means for receiving energy radiating alternately from the plants and soil as the same successively pass the housing; means in the housing for separating the radiant energy into first and second components, said first component having a wave length range lying primarily below 700 millimicrons and said second component having a wave length range lying primarily above 800 millimicrons; first radiant energy detecting means in the housing for generating a first output corresponding to said first component; second radiant energy detecting means in the housing for generating a second output corresponding to said second component; and comparison means connected to receive said first and second outputs and operable to generate said signal to operate said tool means when the difference in said outputs exceeds a selected value.

6. Apparatus for thinning plants growing in a row in soil of varying color and type, said plants having an energy reflectance curve with an abrupt transition between energy wave lengths below 700 and above 800 millimicrons, and said soil, irrespective of its color or type, having a substantially smooth energy reflectance curve between energy wave lengths below 700 and above 800 millimicrons, said apparatus including tool means adapted to be advanced along the row and operable in response to a signal to remove selected plants from said row, and means for detecting plants against the soil background and generating a signal to operate the tool means in response to the detection of a plant, said detecting means comprising: a housing adapted to be advanced along the row with the tool means for receiving energy radiating alternately from the plants and soil as the same successively pass the housing; means in the housing for separating the radiant energy into two components; first radiant energy detecting means in the housing for detecting one of said components and generating an output corresponding to a first selected wave length range lying primarily below 700 millimicrons; second radiant energy detecting means in the housing for detecting the other of said components and generating an output corresponding to a second selected wave length range lying primarily above 800 millimicrons; and comparison means connected to receive the outputs of said first and second radiant energy detecting means and operable to generate said signal to operate said tool means when the difference in said outputs exceeds a selected value.

* * * * *